(12) United States Patent
Joseph et al.

(10) Patent No.: US 6,904,805 B2
(45) Date of Patent: Jun. 14, 2005

(54) ACCELEROMETER

(75) Inventors: Peter D. Joseph, Twin Lakes, WI (US);
Erik W. Linske, Greendale, WI (US);
Kenneth A. Albrecht, Zion, IL (US)

(73) Assignee: Cherry Corporation, Pleasant Prairie, WI (US)

( * ) Notice: Subject to any disclaimer, the term of this patent is extended or adjusted under 35 U.S.C. 154(b) by 0 days.

(21) Appl. No.: 10/453,267

(22) Filed: Jun. 3, 2003

(65) Prior Publication Data

US 2004/0244485 A1 Dec. 9, 2004

(51) Int. Cl.$^7$ ............................................. G01P 15/08
(52) U.S. Cl. ............................... 73/514.38; 73/514.26; 73/514.31; 73/514.32
(58) Field of Search ........................ 73/514.38, 514.26, 73/514.31, 514.32, 514.24, 514.16

(56) References Cited

U.S. PATENT DOCUMENTS

| | | | |
|---|---|---|---|
| 3,961,185 A | | 6/1976 | Brokenshire et al. |
| 4,849,655 A | | 7/1989 | Bennett |
| 5,022,264 A | * | 6/1991 | Stauber .................... 73/514.32 |
| 5,528,937 A | * | 6/1996 | Dufour ..................... 73/514.32 |
| 5,604,313 A | * | 2/1997 | Cahill et al. ............. 73/514.38 |
| 5,824,901 A | | 10/1998 | Van Seeters |

FOREIGN PATENT DOCUMENTS

| | | |
|---|---|---|
| DE | 44 31 232 A1 | 3/1996 |
| EP | 0 395 922 A1 | 11/1990 |
| EP | 0 431 807 A1 | 6/1991 |
| EP | 1 031 837 A1 | 8/2000 |
| JP | 2002055 | 2/2002 |

OTHER PUBLICATIONS

Communication Relating to the Results of the Partial International Search for corresponding PCT International Application No. PCT/US2004/016598, dated Aug. 20, 2004.

* cited by examiner

Primary Examiner—John E. Chapman
(74) Attorney, Agent, or Firm—Brinks Hofer Gilson & Lione (57) ABSTRACT

An accelerometer is limited to a very small displacement range, and within that range, is useful for detecting motion and change of rate of motion by optical, magnetic, or electrical means. A unique spring suspends a planar mass that is very sensitive to motion of an object in which the accelerometer is held. In one embodiment, an optical detector detects the motion of the mass by the intensity of reflected radiation. In another embodiment, a Hall-effect sensor detects the motion of the mass by a current generated by the motion of the mass in an electric field. The accelerometer may be used in a variety of automotive, appliance, and industrial applications.

19 Claims, 5 Drawing Sheets

ACCELEROMETER

FIELD OF THE INVENTION

This invention relates to accelerometers and sensors useful for detecting motion and rates of change of motion of objects in which the sensors are mounted.

BACKGROUND OF THE INVENTION

Accelerometers are useful in detecting motion in objects. The theory behind an accelerometer is that motion is detected in a sensitive portion of the accelerometer. This motion is indicative of motion in the larger object or application in which the accelerometer is mounted. Thus, a sensitive accelerometer can quickly detect motion in the application. This quick reaction time may be useful in many ways, such as sensing deceleration in an auto and activating a protective airbag.

Present sensors suffer from many defects, including fatigue of the detecting element of the sensor, high cost, low yield, and complicated manufacturing processes. In one example, U.S. Pat. No. 4,711,128 features a micromachined accelerometer that detects motion of the moving element by a capacitance method. This accelerometer has a very complicated structure made by a micromachining technique, in which two parallel end arms and a plurality of intermediate arms deflect as a result of motion. This type of structure requires a high front-end investment and typically has a low yield in manufacturing because of the many steps involved in manufacture.

A similar technique is used in U.S. Pat. No. 5,610,335, for accelerometers that require even more steps for manufacture. In another example, U.S. Pat. No. 6,497,149 uses a pair of fixed electrodes and a mobile electrode to detect a change in capacitance between the electrodes. The mobile electrode is suspended by springs, and motion is detected in accordance with the mass of the mobile electrode and the spring constant of the springs and the mobile electrode. This construction may suffer from fatigue in the springs, as the mass continuously moves and exercises the springs. If the springs are tempered or the mass adjusted so that fatigue life is enhanced, the sensitivity of the accelerometer may be affected. The present invention is directed at correcting these deficiencies in the prior art.

SUMMARY

One embodiment is an accelerometer comprising a housing and a spring comprising a planar area separated from a periphery of the spring by at least one path. There is also a detector for detecting motion of the planar area, and a conversion circuit for converting the motion into electrical signals. Another embodiment of the invention is an accelerometer comprising a housing and a spring comprising a central planar area separated from a periphery of the spring by at least one path. There is a detector for detecting motion of the planar area, and a conversion circuit for converting the motion into electrical signals.

Another embodiment is a method of detecting movement. The method comprises suspending a planar spring and vibrating the planar spring in response to motion. The method also comprises detecting vibration of the spring and generating a signal indicative of the vibration. Another embodiment is a motion detector. The motion detector comprising a housing, a spring comprising a planar area separated from a periphery of the spring by at least one path, and a detector for detecting motion of the planar area.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PRESENTLY PREFERRED EMBODIMENTS

Figures 1, 2, 3:
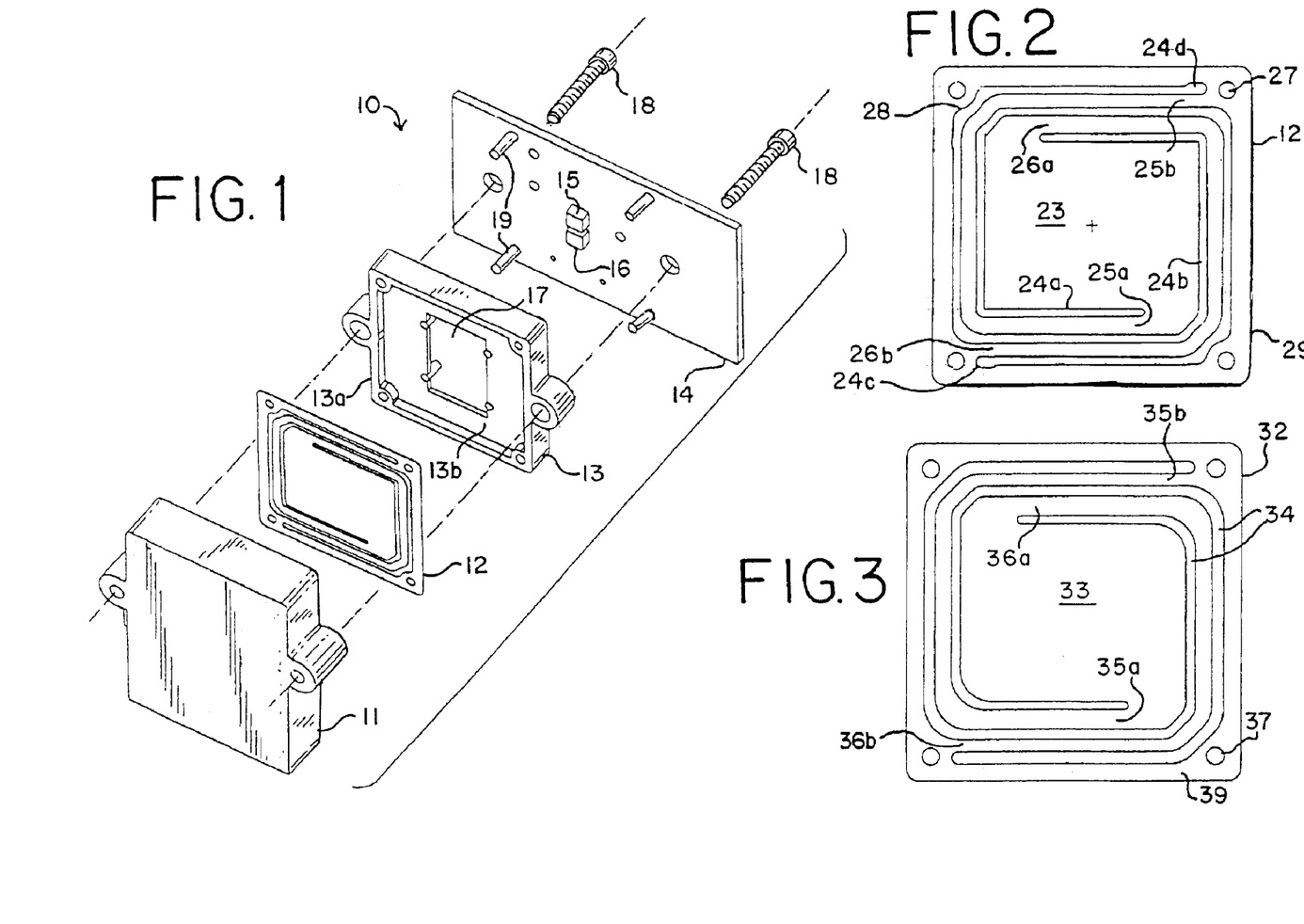
FIG. 1 is an exploded view of a first embodiment of the accelerometer, including a spring element.
FIG. 2 is a plan view of the spring element from the embodiment of FIG. 1.
FIG. 3 is a plan view of a second embodiment of a spring.

A first accelerometer embodiment 10 is depicted in FIG. 1. FIG. 1 is an exploded view, included a back housing portion 11, a spring accelerometer element 12, a front housing 13, and a printed circuit board 14. Front housing 13 has raised portions 13a, lower portion 13b, and a central orifice 17. Back housing 11 may also have raised and lower portions, as shown for front housing 13. The printed circuit board will preferably be as small as possible, as will the other components, so that the accelerometer will be as small as possible. The accelerometer will thus fit easily into an object whose motion or rate of motion is to be measured. The printed circuit board in this embodiment has an infrared detector comprising infrared transmitter 15 and infrared receiver 16 mounted on the circuit board. The accelerometer may be assembled with fasteners 18. Assembly may be facilitated by pins 19 mounted on the printed circuit board or elsewhere, such as on the front or back housing portion, with mounting holes suitably located in the other components.

The accelerometer is mounted in a device for which motion or rate of change of motion, that is, velocity or acceleration, is to be detected. Suitable applications may include autos, home appliances, industrial machinery, or any other machines or devices that are subject to motion, and in which it is desired to know when the motion or rate of change of motion is out of predetermined bounds. The accelerometer embodiment of FIG. 1 works as follows. When the machine or device in which the accelerometer is mounted is functioning normally, infrared transmitter 15 transmits infrared light through orifice 17 onto the spring element 12, and the light is reflected back from spring element 12, back through orifice 17, and onto infrared receiver 16.

The infrared receiver detects this light and generates an electrical signal, voltage or current, that is proportional to the intensity of the light. In one embodiment, the detector will generate an electrical signal in the form of a sine wave to another circuit, such as a microprocessor controller. Other embodiments may use other signals. The microprocessor controller will compare the voltage or current to preset limits. If the voltage or current exceeds those limits, the microprocessor controller can then output a signal. The signal may be any desired signal, such as an alarm to alert an operator of the machine, a signal to shut off the machine, or a signal to start a timer before alerting an operator or shutting off the machine. The output signal may also be used to instruct the machine or device to move to a lower speed or to re-start after a set time. The output signal may also be used for any other desired purpose.

FIG. 2 depicts a plan view of spring element 12. Spring element 12 is desirably stamped from stainless steel, preferably from grades 301, 304, or 316, although other alloys or other non-metallic materials may also be used. For instance, stiff, strong thermoset or thermoplastic materials may be made in the shape of the spring. In one embodiment, the spring is made from 304 stainless steel, about 0.005 in (about 0.013 cm) thick, plus or minus about ten percent, and has a flatness tolerance of about 0.010 in (about 0.025 cm). In one embodiment, the spring is about one and one-quarter inches square (about 3.2 cm square), and has a central area about 0.7 by about 0.9 inches (about 1.8 cm by about 2.3 cm). Smaller or larger spring elements may be used. The central area 23 is in the general shape of a square or rectangle.

In order to be useful for reflecting light, the spring should be clean and preferably not have a rusted, painted, or oiled surface. The spring is also preferably stamped from coilstock, using stamping oils or preferably, a "vanishing" stamping oil that evaporates after the stamping process. While stamping is a low-cost method for manufacturing a large quantity of these springs, the springs may also be made by other methods, such as laser cutting, water-jet cutting, or even by chip-cutting methods, such as drilling or milling. It has not been found necessary to apply a rust-preventive or coating material to the stainless steels that have been used. Cold rolled steel has also been found useful, and such steels would likely benefit from the application of a rust-preventive treatment.

In order to enhance the reliability of the accelerometer, spring 12 should be held firmly by housing portions 11 and 13. As can be seen in FIG. 1, planar spring 12 is supported on all four sides by raised edge portions 13a of housing portion 13. Housing portion 11 has similar raised edge portions, not depicted in FIG. 1 for clarity. The raised edge portions of housing portions 11, 13 support outer edge portions 29 of spring 12, and provide stability and repeatability for the motions of central planar portion 23 of the spring. Pins 19 may also protrude from printed circuit board 14 for grasping and aligning spring 12 by orifices 27 and also to align housing portions 11, 13. A small relief or scallop 28 is provided between orifices 27 and the relief cuts that closely approach the orifices in order to insure material integrity near the corners of the spring.

Housing portions are desirably made of an opaque, stiff material that will house infrared emitter 15 and receiver 16 without interference from outside light. The housing portions may desirably be made from an opaque nylon or other thermoplastic or thermoset material, such as stiffer grades of polyethylene or polypropylene, ABS, phenolic, or other convenient and appropriate material. Reinforcement, such as glass-reinforcing fibers, may add a desirable degree of stiffness and strength to the housing.

Spring 12 comprises a central planar portion 23 that is surrounded by relief cuts 24a, 24b. The relief cuts allow central planar portion 23 to deflect or move in a direction perpendicular to planar portion 23. The relief cuts 24a, 24b describe paths generally parallel to the outer sides of the spring. Each cut 24a, 24b begins bordering central planar portion 23 and ends adjacent an outer edge 29 of the spring. Relief cuts 24a, 24b border strips of steel, lands that support central planar portion 23. In this embodiment, one such steel strip or land begins at point 25a near central planar portion 23 and ends at point 25b, near edge 29 of the planar spring. Another such land begins at point 26a near central planar portion 23 and ends near point 26b, near edge 29 of the planar spring. A small additional relief 28 is provided between perforations 27 in the corners and the relief cuts that closely approach the perforations, to insure material integrity near the corners of the spring.

The cuts or paths 24a, 24b extend for more than a complete cycle around the outer perimeter or periphery of the spring. For example, cut 24a begins adjacent planar portion 23 and takes a first cut to the left in FIG. 2, followed by an upward cut, then a cut to the right and then a cut downwards; then there is a final cut to the left, ending in a slightly enlarged portion 24c. If planar spring 12 and central planar portion 23 were generally circular or elliptical, cuts 24a, 24b would each describe more than 360° around the periphery of the spring. Planar portion 23 is then suspended by a periphery, or outside edge, of the planar portion. This support lessens the fatigue experienced by the spring and the planar portion as it vibrates and moves in use. Planar portion 23 is preferably supported by the entire periphery as shown in FIG. 2, with paths as shown.

It has been found desirable that the cuts or interruptions describe more than a complete path around planar portion 23, the cuts or paths roughly parallel to the outer periphery of the spring. Thus, in FIG. 2, instead of describing four cuts for the four sides of a square or a rectangle, each relief cut describes five sides, allowing for a looser spring and more movement of central planar portion 23. If spring 12 and central planar portion 23 were circular, elliptical, or had another continuous, non-polygonal shape, the cuts should preferably describe about 450° of arc, rather than 360°, in order to enhance the sensitivity or movement of the central planar portion. A spring with a central planar portion having interrupting paths that traverse once around the central planar portion will work, and a spring with a central planar portion having interrupting paths that traverse twice around the central planar portion will also work in this application. However, a central planar spring with cuts that are intermediate between one complete path and two complete paths around the central planar portion seems to work best for defining a motion-sensitive spring element.

Another discovery for spring element 12 concerns the proportions of the cuts and the lands or steel remaining between the cuts. It has been found that spring elements are more sensitive and more resistant to fatigue if certain proportions are observed between the parts of the spring. Thus, in FIG. 2, if the width of the land in the vertical direction at point 25a is width "w," then the spring performs very well if the width of the land varies linearly from point 25a to point 25b, and the width of the land in the vertical direction at point 25b is ⅔ "w". The same holds true for the width of the land at point 26a, that is if the vertical width at point 26a is "w," then the width of the land at point 26b is desirably ⅔ "w", with the width of the land varying linearly between points 26a and 26b. In one embodiment, the dimension "w" is about 0.060 inches (about 0.15 cm). Allowing the width of steel remaining to increase contributes to the stability of the spring as well as its fatigue resistance, without undesirably affecting the sensitivity of spring element 12. Another example of a steel portion that is somewhat wider in order to resist fatigue is the land 28 surrounding perforation or orifice 27 where the cuts or paths closely approach the orifice or perforation in spring 12. Note that the lands, and therefore the cuts, are "scalloped" to provide more steel toward the center of spring 12.

In one embodiment, spring element 12 is stamped from stainless steel that is about 0.005 inches (0.013 cm) thick. In this example, the accelerometer is capable of detecting an acceleration or gravity "g" force from about 0.1 g to about 2.0 g. The central planar portion deflects up to about 0.002 inches (0.005 cm) during a 2 g acceleration. Greater deflection is possible with other spring configurations, and the accelerometer is not limited to detecting forces of 2 g, but may be used to detect 5 g or 10 g in other embodiments.

Another embodiment of a spring having a central planar spring element is depicted in FIG. 3. Spring 32 has a central planar portion 33, a first land from about point 35a to about point 35b, and a second land from about point 36a to about point 36b. Paths 34 separate the first land from the second land. In addition, mounting perforations or features 37 near edges 39 are provided by stamping or other process. In a preferred embodiment, if the width of the first land in a vertical direction at point 35a is "w", then the width of the land in a vertical direction at point 35b is about ⅔ "w". In the same manner, if the width of the second land in a vertical direction at point 36a is "w", then the width of the second land in a vertical direction at point 36b is about ⅔ "w". Note that in this embodiment, there is no small "scallop" or other feature to increase the width of the steel between perforations 37 and paths 34.

Figure 4:
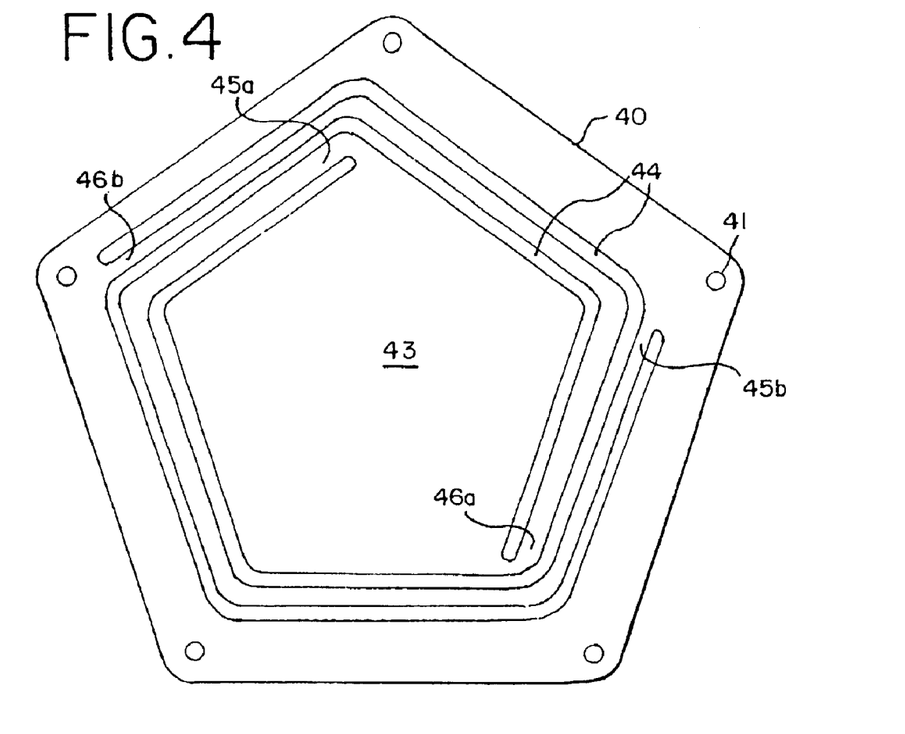
FIGS. 4–5 are further embodiments of a spring.

It will be understood that the spring used in embodiments of the accelerometer may be in a configuration other than a square or a rectangle. FIG. 4 depicts a spring 40 in the shape of a five-sided polygon or pentagon with a central planar portion 43 in the general shape of a pentagon and with mounting features 41 on the periphery of the spring. Spring 40 is stamped from stainless steel and is desirably 17 or 18 gauge sheet metal, about 0.005 inches (about 0.013 cm) thick. Spring 40 has a first land extending in about four legs from point 45a to point 45b, and a second land extending in three legs from point 46a to point 46b. Note that each land has three or four legs, while each path or cut 44 has six legs, as the cuts traverse from beginning to end.

As stated above with regard to springs in the general shape of a square or a rectangle, the cuts traverse more than a full path on all sides around central planar portion 43, separating the central planar area from the periphery or outside edge of the spring. This provides a sensitive spring element. In this embodiment, the width of the first land at point 46a is greater than the width of the first land at point 46b. The width of the land is desirably about one and one-half times as great at point 46a as it is at point 46b. The same holds true for the second land, the land extending from point 45a to point 45b: the width of the land at point 45a is about one and one-half times as great as it is at point 45b. This configuration provides both a sensitive planar element as well as resistance to fatigue. Note that the central planar area does not provide a perfect shape of a square, a rectangle, a pentagon, a circle, or other geometric figure, because of the placement of the cuts or paths.

Figure 5:
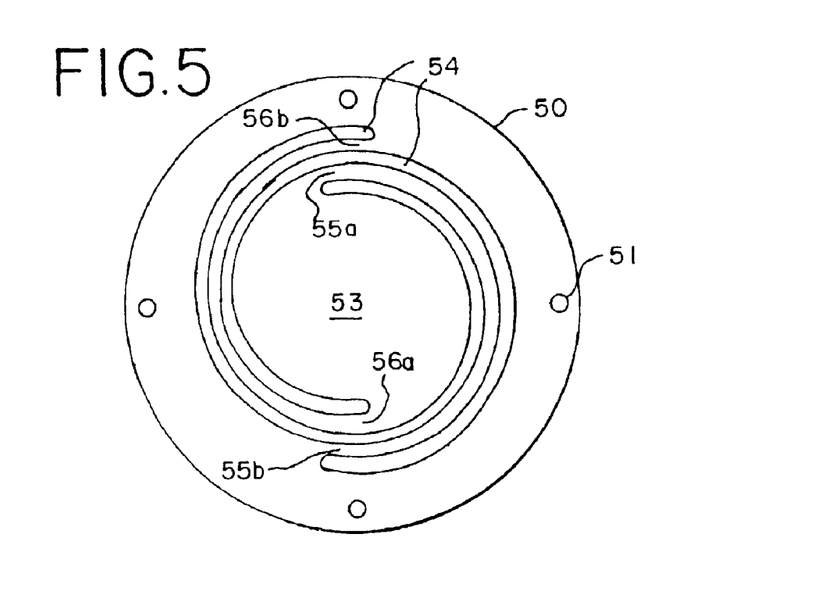

Yet another embodiment of a spring useful in accelerometers in depicted in FIG. 5. In this embodiment, spring 50 is in the general shape of a circle, but may also be in the shape of an ellipse or other shape with some degree of radial symmetry. Spring 50 has a central planar area 53 in the general shape of a circle or an ellipse, with apertures 51 for mounting the spring in an accelerometer. The central planar area is surrounded by two interrupting paths 54 in the general shape of arcs, but with each arc extending more than about 180°. Since a part with radial symmetry does not have "sides," the arcs around the central planar area describe more than a full path, or 360°, between the central planar area and a periphery of the spring.

In this embodiment, each arc is about 225°, so that the total angular path of the two interrupting arcs is about 450°, desirably between 360° and 720°. A first land is described in the shape of an arc from about point 55a to about point 55b, and a second land is in the shape of an arc from about point 56a to about point 56b. The width of the lands at points 55a, 56a, is about one and one-half times as great as the width of the lands at points 55b, 56b.

Figure 6:
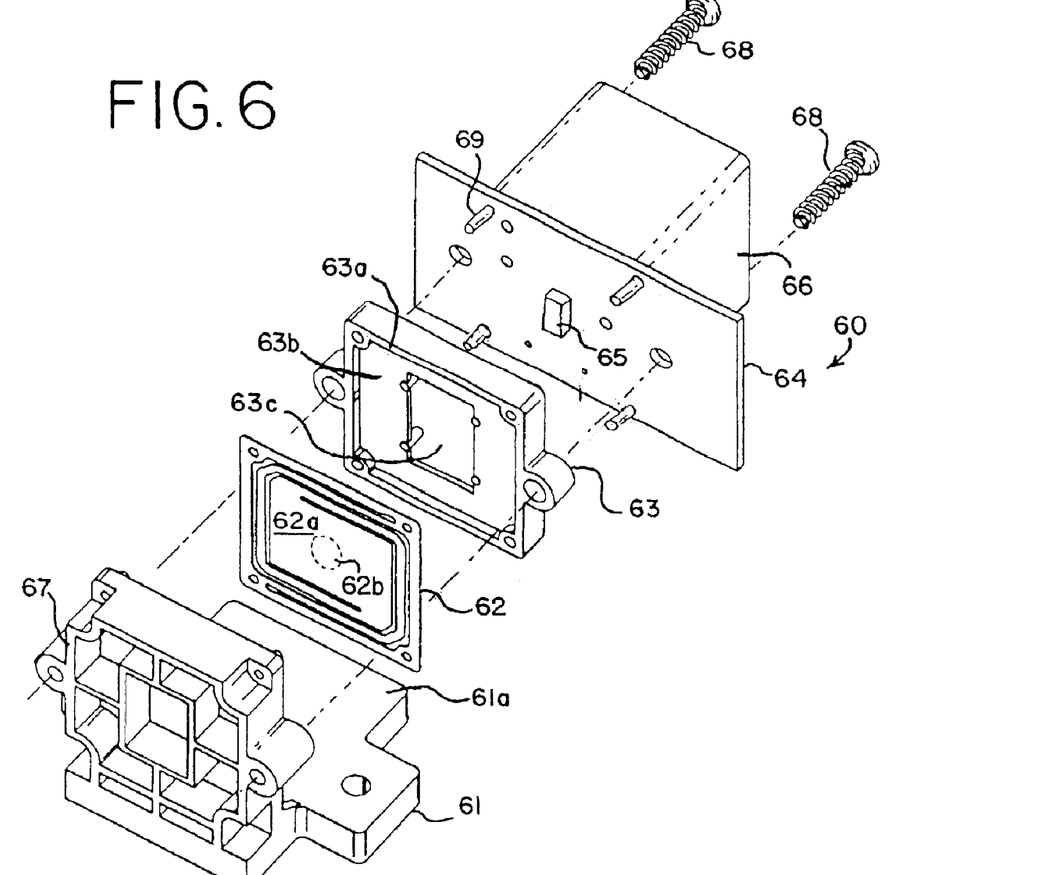
FIG. 6 is an exploded view of a second embodiment of the accelerometer.

Another embodiment of an accelerometer is depicted in FIG. 6. Accelerometer 60 comprises a first housing portion 61, a spring 62, a second housing portion 63, and a printed circuit board 64. A small magnet 62b is bonded to spring 62. The accelerometer may include a relay 66 to send a signal from the accelerometer. The components of accelerometer 60 may be assembled with fasteners 68. First housing portion 61 may include a portion stiffened with ribs 67 to provide stiff and strong support for spring 62. First housing portion 61 may also include a side portion 61a to support relay 66 when the accelerometer is assembled. Spring 62 may be in a rectangular shape as shown, or may be any other convenient shape that is useful. Second housing portion 63 may include a raised portion 63a to support the outer periphery of spring 62. Second housing portion 63 may also include lower portion 63b to allow movement and deflection of a central planar area of spring 62. Second housing portion 63 may also include a central aperture 63c.

In the embodiment of FIG. 6, the accelerometer utilizes the Hall effect rather than an optical principle. In this embodiment, the detector for the accelerometer comprises the spring 62, the magnet 62b, and a Hall-effect sensor 65. Hall-effect sensor 65 is mounted on the printed circuit board 64. As the object in which the accelerometer is mounted moves, accelerates and decelerates, the central planar area 62a of spring 62 and magnet 62b moves closer or further away from the Hall-effect sensor 65. Hall-effect sensor 65 generates a magnetic field when the sensor is turned on. A current is generated by the presence of magnet 62b in the vicinity of the Hall-effect sensor and its magnetic field. The current is greater when the magnet is close to the sensor, and the current is less when the magnet moves away. An electronic circuit on the circuit board may use this varying current directly or may convert the current to a voltage signal. As the amplitude of the spring deflection increases, the amplitude of the current or voltage signal increases. When the amplitude is above a set limit, a controller, such as a microprocessor controller, may send a signal as a result of the change in amplitude.

Figure 7:
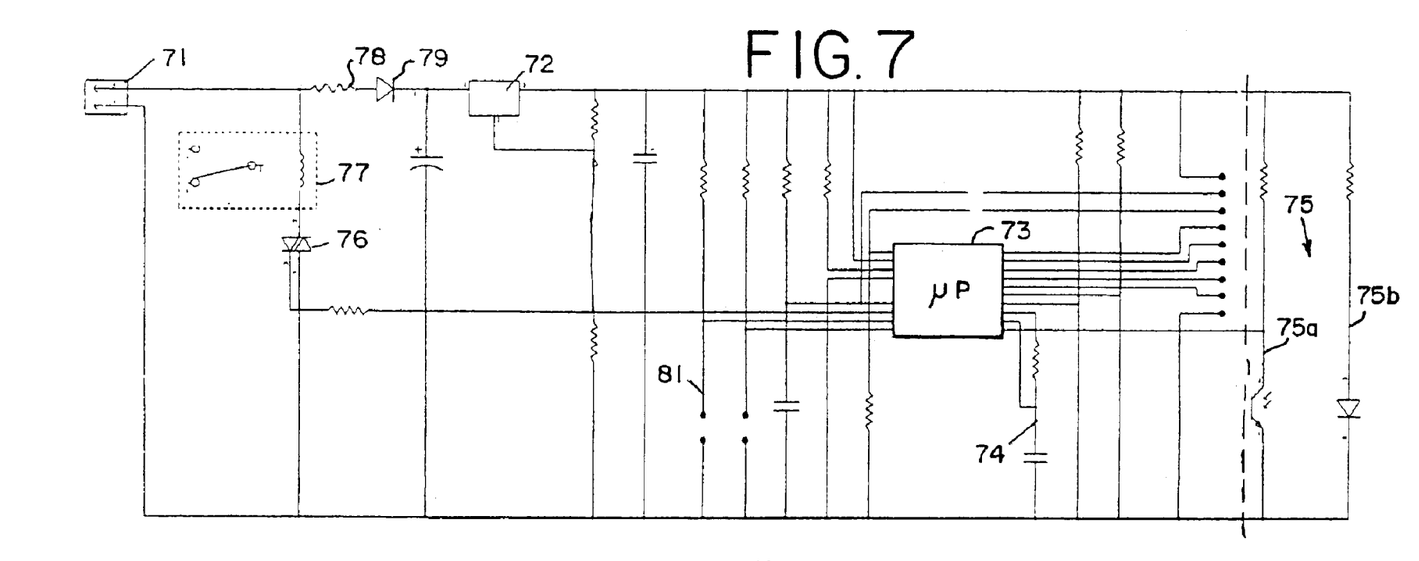
FIG. 7 is a schematic view of an electrical circuit for the embodiment of FIG. 1.

FIG. 7 is an electrical circuit useful for an optical embodiment. The circuit includes a power inlet 71, which may accept 120V AC or other power source. The circuit includes a power supply or converter 72 which converts power to a lower voltage and powers the circuit, including microprocessor controller 73. Microprocessor controller 73 may be any suitable microprocessor capable of controlling an optical circuit 75. Exemplary are the Motorola 68HC90 series, the Atmel Tiny 11 series, or the Texas Instruments MSP 430 series of microprocessor controllers. Other suitable controllers may be used, so long as they are capable of controlling an optical circuit and sending a signal. Optical detector circuit 75 includes an optical emitter 75b and optical receiver 75a. Exemplary are an Osram SFH 420 emitter and an SFH 320 detector. Other optical circuits may be used. The remainder of the circuit may include, among other components, a current-limiting resistor 78, a protective diode 79, paths to ground 74, and test points 81.

In this embodiment, microprocessor controller 73 is capable of sending an output signal to a triac 76 that controls a relay 77. If the accelerometer is mounted in an auto, the microprocessor controller and relay may send a signal to an automotive ECU that controls an airbag to initiate inflation of the airbag when deceleration rises to a preset limit.

If the accelerometer is mounted in a washing machine or dryer, the microprocessor controller and relay may control power to the washing machine or dryer controls, halting the machine if an unbalance occurs and the acceleration rises to certain limits. The microprocessor and relay may instead send a signal to reduce speed. If the accelerometer is mounted in a golf cart and a certain level of acceleration is reached, the accelerometer may turn off power to the motor in order to halt a runaway cart. An override or reset in operable communication with the microprocessor controller may be also be used to restore power to the application.

Many other applications are possible for embodiments of the accelerometer using an optical circuit. For instance, when the microprocessor controller activates the triac and, through the relay, shuts off the washing machine, it may also start a timer that will time out and re-start the machine after a period of time if the user has not already done so. In addition, the microprocessor controller may be used for other actions besides activating a relay. The controller may instead send an alarm when the accelerometer reaches a certain level of acceleration, and may send a second alarm when the accelerometer detects a higher level of acceleration. These alarms may be referred to as a first or low alarm and a second or high alarm. A signal other than an alarm, such as a signal to record, or any other desired signal from the controller, may also be used.

Figure 8:
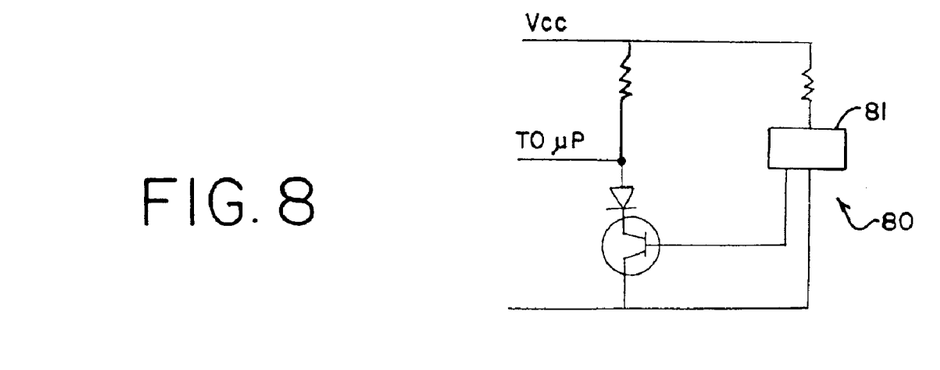
FIG. 8 is a partial schematic view of an electrical circuit for another embodiment.

While FIG. 7 is an embodiment of an electrical circuit using optical devices, other embodiments may also be used. FIG. 8 depicts a Hall-effect detector circuit 80, to be used in place of the optical detector circuit of FIG. 7. All other elements of the circuit may remain the same, except for minor changes that may be necessary for electrical compatibility. In this embodiment, a small magnet is bonded to the spring as described above. The Hall-effect sensor 81 senses when the magnet is near, and generates a signal to microprocessor 73. The signal may be a current or Hall-effect circuit 80 may convert the current to a voltage for ready use by microprocessor controller 73. In this manner, motion, acceleration, and deceleration are detected by the interaction of the magnet and Hall-effect sensor 81, and are relayed to the microprocessor for interpretation so that a signal may be output by the microprocessor if necessary. Hall-effect switches and circuits are available from a number of suppliers, such as the model 3161 Hall-effect switch from Allegro Microelectronics. Other suppliers and circuits may be used.

The magnet used in Hall-effect detector embodiments should be bonded to the spring. Magnets useful for bonding to the spring may include ferrites, neodymium-boron-iron magnets, samarium cobalt magnets, platinum cobalt magnets and Alnico magnets, as well as other magnets. However, the magnet may also be encapsulated within the spring, and the spring itself may be made of material with sufficient magnetic properties, such as Alnico, to suffice as a magnet for detection by the Hall-effect sensor.

Figure 10:
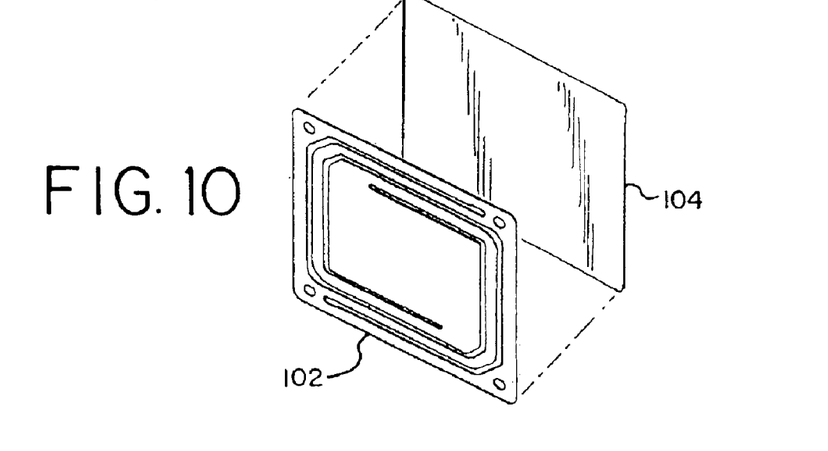
FIG. 10 is a perspective view of a capacitance detector.

A capacitance detector embodiment may also be used. It will be understood that the accelerometer will also work if there is a second mass, preferably rigid and immobile, held relatively close to the spring, such that the spring and the second mass form the plates of a capacitor. This embodiment works on the principle of capacitance, in that the spring and the second mass will store an electrical charge and will build a voltage depending on the proximity of the spring to the second mass. The microprocessor will detect the charge using either a voltage or current signal and will process the resulting signal as described above for other embodiments. FIG. 10 depicts a capacitor detector comprising spring 102 and plate 104. Plate 104 may be a metallic material. Spring 102 and plate 104 may comprise other materials capable of acting as a capacitor for this application.

Figure 9:
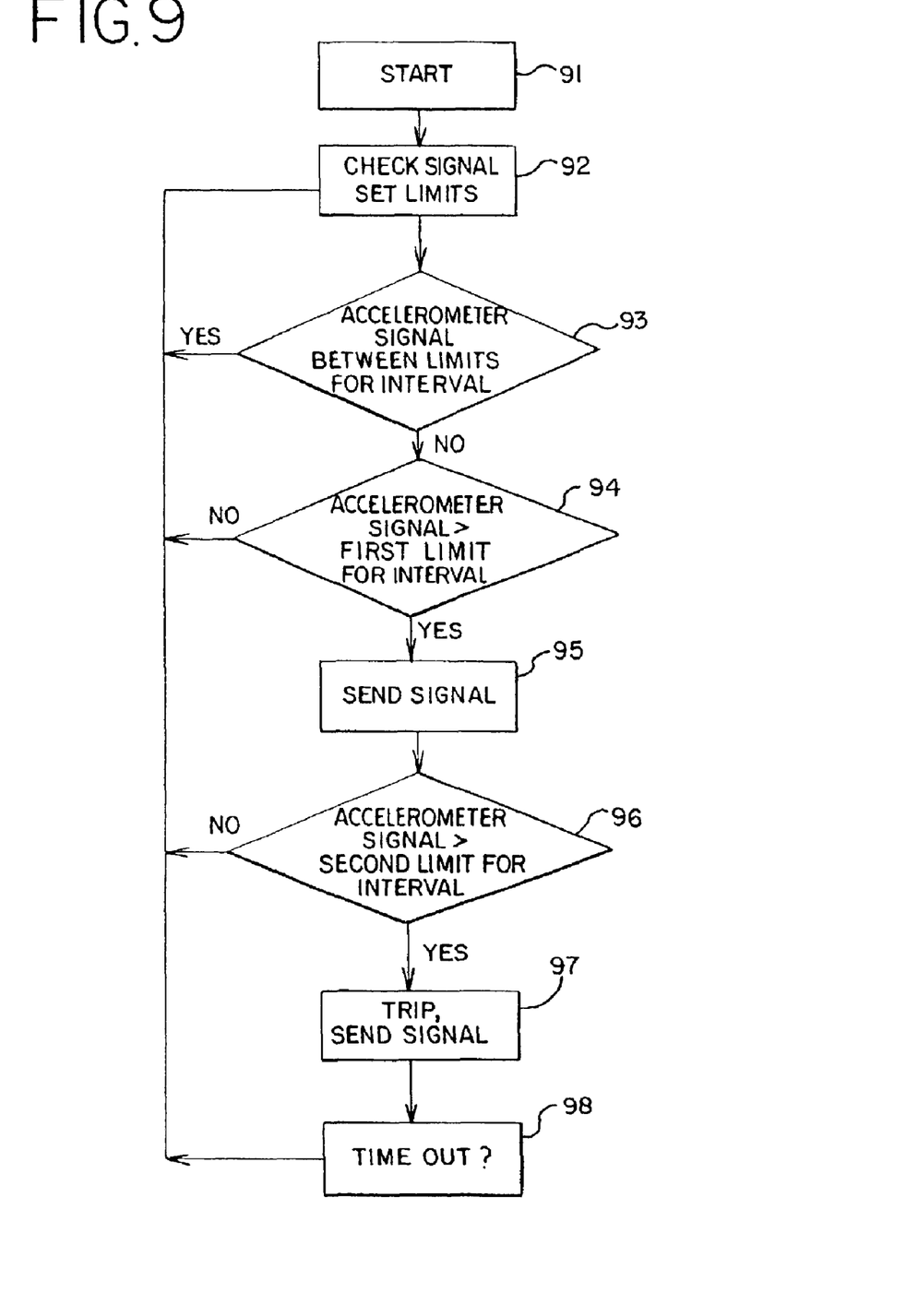
FIG. 9 is a flowchart depicting a method of using an accelerometer according to the present invention.

FIG. 9 is a flowchart depicting a method or process for using embodiments of the accelerometer. The process may start 91 when the auto or other application using the accelerometer is turned on. A microprocessor may first check 92 its settings, including a check on the signal set limits. The accelerometer is then ready. When the application begins to move, the microprocessor may check a current or voltage signal from the accelerometer for a certain interval, such as 5 ms, and determine 93 whether the signal is within specified limits. If the signal is within limits, the microprocessor may then begin another time interval and repeat the process.

If the signal is out of limits, the accelerometer may determine 94 whether the signal is greater than a first or low limit setting. If the signal is not greater, the accelerometer goes into another time interval. If the signal is greater than the first or low limit, the microprocessor may send a signal 95 as discussed above. In some applications, there may be only one limit, and the accelerometer may then shut down the application. If the application has a first low limit and a second high limit, the microprocessor may then check the signal 96 to determine whether it exceeds the high limit. If not, another time interval may follow. If the high limit is exceeded, then the accelerometer may trip the application 97, perhaps shutting it off, and sending a signal or an alarm to alert an operator or perhaps to record the high level. After a certain time period, the microprocessor may end a time out period 98 and re-enable or re-start the application.

Any of these improvements may be used in combination with other features, whether or not explicitly described as such. Other embodiments are possible within the scope of this invention and will be apparent to those of ordinary skill in the art. For instance, springs may be made from tin-plated cold rolled steel and kept in moisture-free environments, rather than using stainless steel. While steel springs are preferred, the springs may also be made from non-metallic materials, such as stiff and strong thermoplastic or thermoset materials, or composite materials made from thermoplastic or thermoset materials. Non-metallic materials may be sufficiently reflective to be used in the optical embodiments described above. The non-metallic springs may instead mount a magnet, as described above for use in the Hall-effect embodiment. The magnet may be adhered, insert-molded, or otherwise mounted to a metallic or non-metallic spring.

Embodiments have been described with cuts or paths between a central planar area and all sides or all portions of a periphery of the spring, in other embodiments, the planar area need not be centered, although that is preferred. Embodiments include springs in which there may be a single, continuous cut or path, covering all sides or portions of the periphery, and embodiments in which there is more than one cut or path between the planar area and the periphery. All such embodiments are meant to be included.

While the optical embodiments have been described mostly in terms of infrared radiation, it will be understood that visible light, ultraviolet light, and light of other wavelengths may also be used. The terms light and optical refer to any portion of the electromagnetic spectrum. Therefore, the invention is not limited to the specific details, representative embodiments, and illustrated examples in this description. Accordingly, the invention is not to be restricted except as necessitated by the accompanying claims and their equivalents.

What is claimed is:

1. An accelerometer, comprising:
   a housing;
   a spring comprising a planar area separated from a periphery of the spring by at least one path;
   a detector for detecting motion of the planar area; and
   a conversion circuit for converting the motion into electrical signals, wherein the planar area is supported by at least one land with a width that varies linearly.

2. The accelerometer of claim 1, wherein the detector is selected from the group consisting of an optical detector, a magnetic detector, and an electrical detector.

3. The accelerometer of claim 1, wherein the detector is an optical detector comprising an optical emitter and an optical receiver.

4. The accelerometer of claim 3, wherein the optical detector uses light in a portion of the electromagnetic spectrum selected from the group consisting of visible, ultraviolet, and infrared light.

5. The accelerometer of claim 1, wherein the detector is a magnetic detector comprising a Hall-effect sensor.

6. The accelerometer of claim 1, wherein the detector is a capacitane detector.

7. The accelerometer of claim 1, wherein the at least one path describes from one to two complete paths between the planar area and the periphery.

8. The accelerometer of claim 1, wherein the planar area is a square or a rectangle separated on four sides with paths between the planar area and the periphery.

9. The accelerometer of claim 1, wherein the spring is nonmetallic.

10. The accelerometer of claim 1, wherein the width decreases by one-third over at least a portion of the land.

11. A method of detecting movement, the method comprising:
    suspending a planar spring by at least one land having a width that varies linearly;
    vibrating the planar spring in response to motion;
    detecting vibration of the spring; and
    generating a signal indicative of the vibration.

12. The method of claim 11, further comprising generating a second signal if the vibration exceeds a threshold level.

13. The method of claim 11 wherein the steps of vibrating and detecting are accomplished by a method selected from the group consisting of an optical method, a magnetic method, and an electrical method.

14. The method of claim 11, wherein the planar spring comprises a central planar area separated from a periphery of the spring by at least one path.

15. The method of claim 11, wherein the spring is nonmetallic.

16. A motion detector, comprising:
    a housing;
    non-metallic spring comprising a planar area separated from a periphery of the spring by at least one path, wherein the width of the at least one path varies linearly; and
    a detector for detecting motion of the planar area.

17. The detector of claim 16, further comprising a conversion circuit for converting the motion of the planar area into an electrical signal.

18. The detector of claim 16, wherein the at least one path describes from one to two complete paths between the planar area and the periphery.

19. A motion detector, comprising:
    a housing;
    a non-metallic spring comprising a planar area separated from a periphery of the spring by at least one path, wherein the planar area is supported by at least one land with a width that varies linearly; and
    a detector for detecting motion of the planar area.

* * * * *

UNITED STATES PATENT AND TRADEMARK OFFICE
CERTIFICATE OF CORRECTION

PATENT NO. : 6,904,805 B2 Page 1 of 1
APPLICATION NO. : 10/453267
DATED : June 14, 2005
INVENTOR(S) : Peter D. Joseph et al.

It is certified that error appears in the above-identified patent and that said Letters Patent is hereby corrected as shown below:

In the Claims

Column 9, in claim 6, line 2, before "detector." delete "capacitane" and substitute --capacitance-- in its place.

Signed and Sealed this

Seventh Day of November, 2006

JON W. DUDAS
*Director of the United States Patent and Trademark Office*